United States Patent [19]

Hoffman, Jr.

[11] Patent Number: 4,480,724

[45] Date of Patent: Nov. 6, 1984

[54] DISC BRAKE CALIPER MOUNTING SUSPENSION

[75] Inventor: Charles T. Hoffman, Jr., Waynesville, Ohio

[73] Assignee: General Motors Corporation, Detroit, Mich.

[21] Appl. No.: 468,148

[22] Filed: Feb. 22, 1983

[51] Int. Cl.³ .............................................. F16D 65/02
[52] U.S. Cl. ................................ 188/73.45; 188/73.44
[58] Field of Search ............... 188/72.4, 73.44, 73.35, 188/73.45, 71.8; 308/4 R, 280; 384/281, 297, 299, 300; 267/141.2

[56] References Cited

U.S. PATENT DOCUMENTS

| | | | |
|---|---|---|---|
| 3,997,034 | 2/1976 | Kellogg | 188/73.45 |
| 4,027,750 | 6/1977 | Kawamoto et al. | 188/73.45 |
| 4,109,766 | 8/1978 | Inoue et al. | 188/73.45 |
| 4,113,068 | 9/1978 | Ford | 188/72.5 |
| 4,436,186 | 3/1984 | Ritsema et al. | 188/71.8 |

Primary Examiner—Duane A. Reger
Assistant Examiner—Alvin Oberley
Attorney, Agent, or Firm—D. D. McGraw

[57] ABSTRACT

A caliper mounting boss has a nylon guide sleeve lined with a rubber support bushing through which the caliper mounting bolt extends. The nylon guide sleeve has one end snapping into a groove on the mounting bolt. The bore in the mounting boss through which the assembly extends has wiper seals at each end.

2 Claims, 3 Drawing Figures

DISC BRAKE CALIPER MOUNTING SUSPENSION

The invention relates to a corrosion free mounting suspension for a disc brake caliper which provides free sliding and uses preassembled mounting bolt and suspension members. It uses a constant diameter bore for each mounting bolt, thus simplifying machining of the caliper support member. A support bushing of rubber-like material surrounds the mounting bolt, and a guide sleeve, made of nylon or similar material, is fitted over the mounting bolt and the support bushing. The sleeve slides in the mounting member bore. Wiper seals are provided at each end of the bore.

IN THE DRAWING

Figure 1:
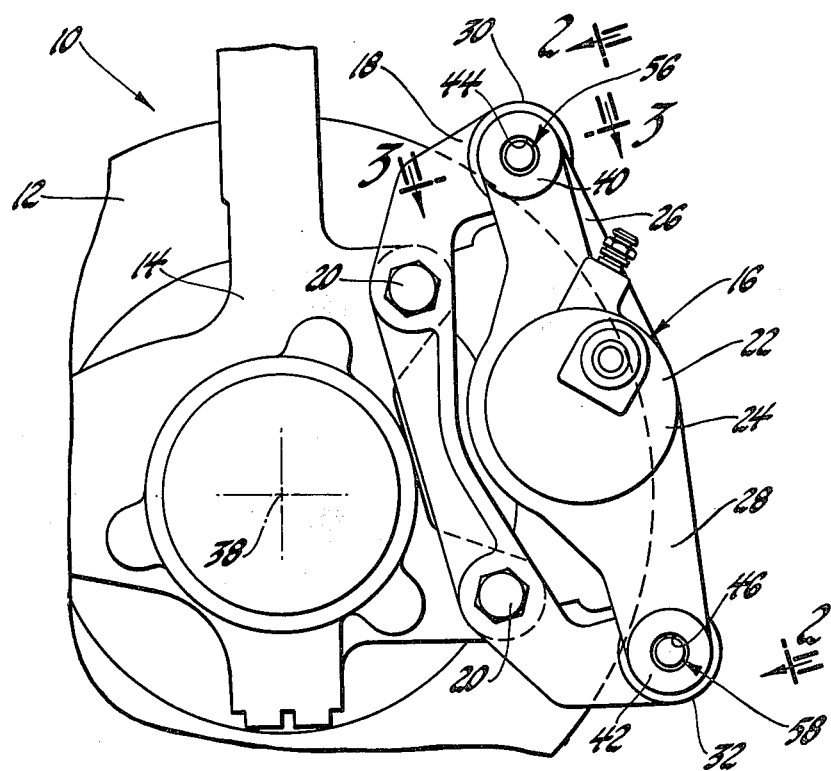
FIG. 1 is an elevation view, with parts broken away, of a disc brake assembly having a caliper mounting suspension embodying the invention.

The disc brake assembly 10 of FIG. 1 includes a rotatable disc 12 mounted to rotate with a vehicle wheel, not shown, on a support member such as the steering knuckle 14. The caliper assembly 16 is slidably mounted on the mounting bracket member 18, which is suitably secured to the steering knuckle 14 by bolts 20. The caliper assembly includes a caliper housing 22 which forms a cylinder section 24 and housing members 26 and 28. Bosses 30 and 32 are formed on the ends of the mounting bracket member 18. The bosses have bores 34 and 36 respectively formed therethrough so that they are axially parallel to the axis of rotation 38 of disc 12. Bores 34 and 36 define cylindrically formed inner surfaces. Housing members 26 and 28 have bosses 40 and 42 respectively located at their outer ends. These bosses are provided with threaded openings 44 and 46, respectively. Openings 44 and 46 are axially aligned with bores 34 and 36 when the caliper assembly is in the installed position illustrated.

Figure 2:
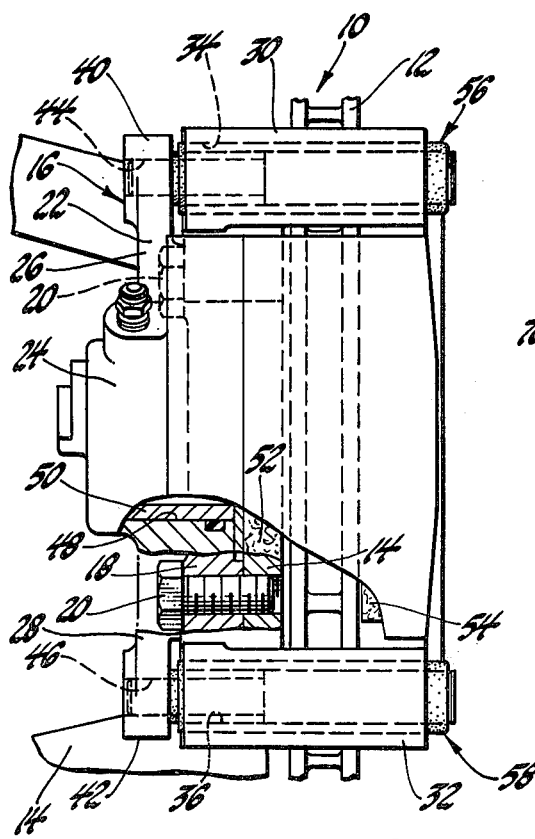
FIG. 2 is a side elevation view, taken in the direction of arrows 2—2 of FIG. 1 and illustrating the caliper embodying the invention with parts broken away and in section.

As shown in FIG. 2, the caliper housing cylinder section 24 has a cylinder 48 formed therein and a piston 50 reciprocably and sealingly mounted in the cylinder. The inboard brake pad assembly 52 is mounted on the caliper housing so that piston 50 will urge it into friction braking engagement with one side of disc 12 when brake actuating pressure is introduced into the cylinder section 24 in a manner well known in the art. The outboard brake pad assembly 54 is mounted on the caliper assembly 16 for friction braking engagement with the outside of disc 12, also in a manner well known in the art.

Figure 3:
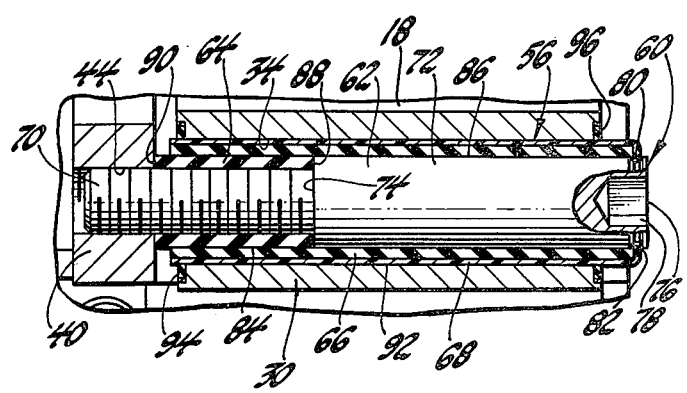
FIG. 3 is a fragmentary cross-section view taken in the direction of arrows 3—3 of FIG. 1 and illustrating the mounting suspension in greater detail.

One of the caliper mounting suspension units 56 is illustrated in greater detail in FIG. 3. It is to be understood that the other caliper mounting suspension unit 58 may be constructed in a similar manner and the following detailed description of unit 56 may also apply to unit 58. Unit 56 includes a mounting bolt and suspension member subassembly 60 composed of a mounting bolt 62, mounting sleeve 64, resilient sleeve 66, and guide sleeve 68. Mounting bolt 62 has a threaded end section 70 of smaller diameter than that of the bolt guide support section 72, with a shoulder 74 provided at the juncture of these two sections. Bolt end 74 is provided with a socket 78 which is adapted to receive a bolt installation and removal tool. A groove 80 is formed in the outer surface of the bolt end 76 and receives tabs 82, formed on one end of guide sleeve 68. The tabs are arranged so that they snap into groove 80 and hold guide sleeve 68 in position over the resilient sleeve 66, which fits over the cylindrical outer surfaces 84 and 86 of mounting sleeve 64 and guide support section 72. Surfaces 84 and 86 form a continuous surface, mounting sleeve 64 being fitted over the bolt end section 70 so that one sleeve end 88 abuts shoulder 74 and the other sleeve end 90 terminates short of the full length of threaded end 70. The cylindrical outer surface 92 of guide sleeve 68 is in close but free sliding engagement with the inner surface of boss 30 defined by bore 34, and is of sufficient axial length relative to the axial length of that bore so as to maintain full sliding engagement therewith throughout the sliding range of motion of the caliper housing. Subassembly 60 may be preassembled as a unit, the resilient sleeve 66 and the guide sleeve 68 holding the mounting sleeve 64 in position against shoulder 74.

Subassembly 60 is installed by threading end section 70 into the threaded opening 44 of housing member boss 40 and extending the subassembly through bore 34 of boss 30. The mounting bolt is tightened so that mounting sleeve end 90 engages the side of boss 40 and the mounting sleeve operates as a compression member, providing sufficient tension in threaded section 70 to retain the mounting bolt within opening 44.

The ends of bore 34 are preferably provided with recesses respectively receiving wiper seals 94 and 96, which are secured to boss 30 and have their inner peripheries sealingly engaging the outer surface 92 of guide sleeve 68 to prevent the entry of foreign matter.

The suspension arrangement embodying the invention therefore provides a preassembled mounting bolt and suspension member subassembly which may be easily removed and replaced as a unit if necessary, improving serviceability. It provides a corrosion free mounting suspension, the mounting bolt of each subassembly being fully protected against corrosion which would tend to decrease free sliding action of the caliper housing relative to the mounting bracket.

The embodiments of the invention in which an exclusive property or privilege is claimed are defined as follows:

1. In a disc brake sliding caliper mounting arrangement for a disc brake assembly having a fixed member providing a mounting bracket, a caliper housing member, at least one mounting bolt having one end secured to one of said members, and the other member having a mounting boss provided with a bore therethrough which said mounting bolt extends, to support said caliper housing member in sliding and guiding relation on said fixed member, the improvement to provide a substantially corrosion-free sliding caliper suspension comprising:

a mounting bolt member and suspension member subassembly including
said mounting bolt having a fastening end section and a diametrically enlarged cylindrically formed guide support section, said guide support section having a circumferentially extending groove formed therein intermediately adjacent the mounting bolt end opposite said fastening end section;

a mounting sleeve over said fastening end section and having one end abutting said guide support section, said mounting sleeve providing an extension of the cylindrical outer surface of said guide support section over a part of said fastening end section;

a resilient rubber-like sleeve defining a support bushing received over said guide support section and said mounting sleeve in sealing relation thereto while leaving said groove uncovered; and a low coefficient of friction guide sleeve having a cylindrical body received over said support bushing in sealing relation thereto, one end of said guide sleeve having radially inward extending tab means snapped into said groove and retaining said guide sleeve axially fixed relative to said mounting bolt;

said subassembly having said fastening end section fastened into a coacting opening formed in said one member so as to be securely mounted on said one member;

said mounting boss bore having a cylindrically formed inner surface in slidable engagement with the outer cylindrical surface of said guide sleeve, and an annular wiper seal mounted at each end of said bore on said mounting boss with the inner annular surfaces thereof engaging said guide sleeve in surface wiping relation and sealing the ends of said bore against intrusion of corrosive materials;

said wiper seals, said guide sleeve and said support bushing cooperating to provide a substantially corrosion-free sliding caliper mounting suspension.

2. In a disc brake sliding caliper mounting arrangement in a disc brake assembly having a fixed mounting providing a mounting bracket, a caliper housing member, and at least one mounting bolt having one end secured to one of said members, said other member having a mounting boss provided with a bore therethrough through which said mounting bolt extends, said mounting bolt supporting said caliper housing member in sliding and guiding relation on said fixed member, the improvement comprising:

a mounting bolt and suspension member subassembly including said mounting bolt having a threaded end section and a diametrically enlarged cylindrically formed guide support section, said guide support section having a circumferentially extending groove formed therein intermediately adjacent the mounting bolt end opposite said fastening end section;

a mounting sleeve over said threaded end section and having one end abutting said guide support section, said mounting sleeve providing an extension of the cylindrical outer surface of said guide support section over only a part of said threaded end section;

a resilient rubber-like sleeve defining a support bushing received over said guide support section and said mounting sleeve in sealing relation while leaving said groove uncovered;

and a low coefficient of friction guide sleeve having a cylindrical body received over said support bushing in sealing relation, one end of said guide sleeve having radially inward extending tab means snapped into said groove in retaining relation and retaining said guide sleeve axially relative to said mounting bolt;

said subassembly having said threaded end section threaded into a threaded opening formed in said one member so as to be securely mounted on said one member;

said mounting boss bore having a cylindrically formed inner surface in slidable engagement with the outer cylindrical surface of said guide sleeve, and an annular wiper seal mounted at each end of said bore on said mounting boss with the inner annular surfaces thereof engaging said guide sleeve in surface wiping relation and sealing the ends of said bore against intrusion of corrosive materials;

said wiper seals and said guide sleeves and said support bushing cooperating to provide a substantially corrosion-free sliding caliper mounting suspension.

* * * * *